United States Patent [19]

Fortune

[11] 4,285,091

[45] Aug. 25, 1981

[54] DESOLDERING SYSTEM FOR USE WITH A SOLDERING INSTRUMENT

[76] Inventor: William S. Fortune, 14250 Dearborn St., Panorama City, Calif. 91402

[21] Appl. No.: 120,568

[22] Filed: Feb. 11, 1980

Related U.S. Application Data

[62] Division of Ser. No. 875,569, Feb. 2, 1978, Pat. No. 4,187,973.

[51] Int. Cl.³ .............................................. A47L 5/38
[52] U.S. Cl. ..................................... 15/310; 15/304; 15/344
[58] Field of Search ................ 15/303, 304, 310, 311, 15/341, 344

[56] References Cited

U.S. PATENT DOCUMENTS

| | | | |
|---|---|---|---|
| 1,267,398 | 5/1918 | Gavin | 15/150 X |
| 1,376,175 | 4/1921 | Sundermann | 15/150 |
| 1,664,824 | 4/1928 | Koeker | 15/147 R |
| 1,762,454 | 6/1930 | Poulos | 15/150 |
| 2,900,652 | 8/1959 | Kautenberg | 15/150 X |
| 3,688,331 | 9/1972 | Saltzstein | 15/229 A |
| 4,054,963 | 10/1977 | Taylor | 15/310 |
| 4,193,160 | 3/1980 | Vandermark | 15/341 |

*Primary Examiner*—Chris K. Moore

*Attorney, Agent, or Firm*—Daniel T. Anderson

[57] ABSTRACT

A desoldering system which operates in conjunction with a soldering instrument which may be of the temperature controlled type disclosed and claimed in applicant's prior U.S. Pat. No. 3,883,716. The desoldering tip is specifically designed for simultaneously desoldering dual-in-line integrated circuit packages, having for example 14 or 16 pins, multiple pins for transistors, 8 or 10 pin round integrated circuit packages and the like. Due to the large throughput of air required to the vacuum system the desoldering attachment features large inlet pipes. The desoldering tip is directly screwed onto the heating element of a soldering instrument surrounded by an air tight sleeve which includes a filter or trap for the solder. The sleeve of the desoldering instrument in turn is connected to another barrel which may include an additional filter and is provided with a three-way trigger valve. The valve selectively connects the desoldering attachment to a vacuum line to pull in the solder, it closes the vacuum line when not depressed, and provides access to the outside air for removing the solder collected in the desoldering attachment. A solder extractor is provided for this purpose. It is connected to a vacuum line and features a snap action to uncover a vacuum connection whereby the desoldering tip and its sleeve may be cleaned by sucking out the solder.

3 Claims, 18 Drawing Figures

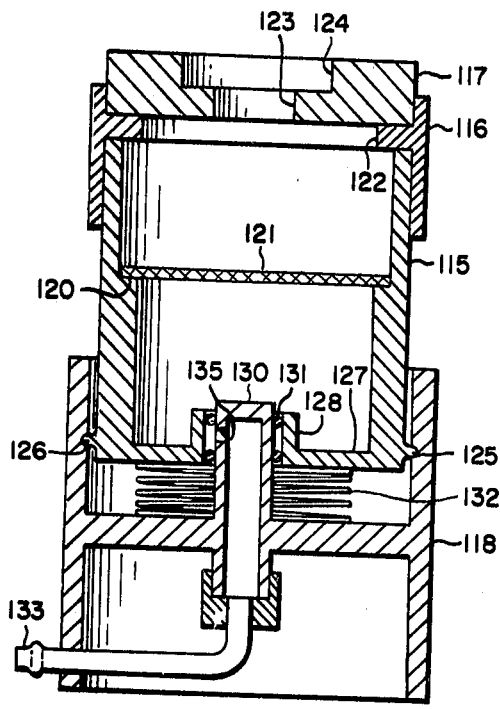
Fig. 14
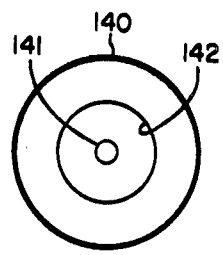
Fig. 17
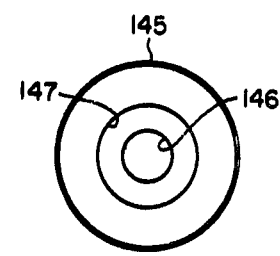
Fig. 18
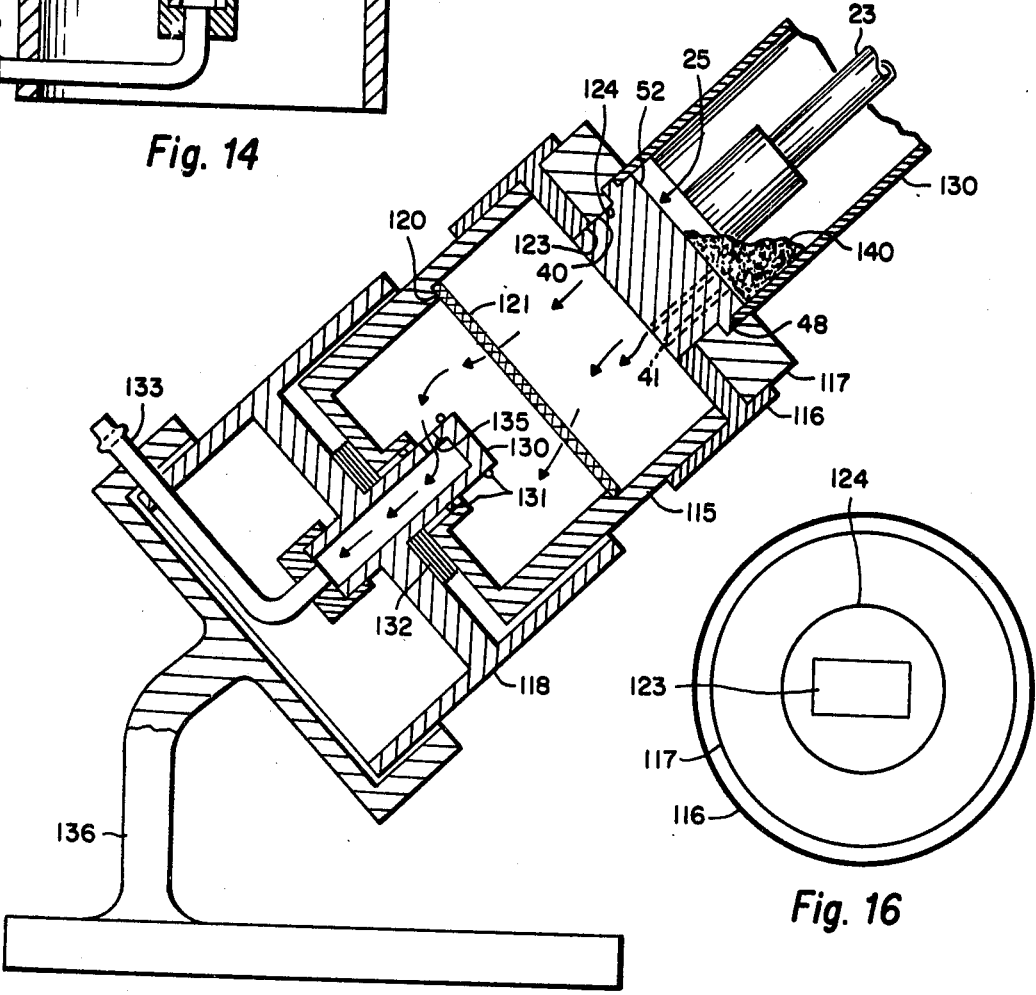
Fig. 15
Fig. 16

DESOLDERING SYSTEM FOR USE WITH A SOLDERING INSTRUMENT

This is a division of application Ser. No. 875,569 filed Feb. 2, 1978, now U.S. Pat. No. 4,187,973 issued 2/12/80.

BACKGROUND OF THE INVENTION

This invention relates generally to desoldering tools and attachments and particularly relates to a desoldering system for use in connection with a soldering instrument.

Such desoldering tools are known in the art and have, for example, been disclosed and claimed in applicant's prior U.S. Pat. No. 4,056,334 (see particularly FIG. 4). Reference is also made to the applicant's copending application Ser. No. 835,670, filed on 9-22-77, now U.S. Pat. No. 4,178,496, issued 12-11-79.

The last referred to application in particular discloses a desoldering attachment which may be used in connection with the applicant's prior U.S. Pat. No. 3,883,716. The desoldering attachment of the prior copending application is particularly designed to operate with a desoldering attachment having a single relatively small opening for removing the solder. Generally the internal diameter of the suction orifice of the desoldering tool may be on the order of 1/16 of an inch.

However, it is frequently desired to desolder, for example, dual-in-line integrated circuit packages which may have 14 or 16 pins. In this case it is highly desirable to be able to desolder simultaneously all of the pins thereby to effect a great saving in labor. Similarly there are many multiple lead electronic components such as 3 pin transistors. Integrated circuit packages may have as many as 8 or 10 pins disposed about the circuit package. For such purposes the desoldering package of the copending application cannot be used very well. In view of the larger number of suction openings of the desoldering tip, a much greater through-put of air is required. This in turn requires a larger pipe or connections to a source of vacuum. Thus the minimum diameter of the vacuum lines should be on the order of ¼ inch.

Furthermore, for such desoldering tips having multiple suction orifices, it is again highly desirable to provide ways or mechanisms for extracting the solder hence to clean the instrument so that it can readily be used again.

It is accordingly an object of the present invention to provide a desoldering system for use in connection with a desoldering instrument which permits to remove the solder simultaneously from a plurality of pins such as are used for dual-in-line integrated circuit packages.

A further object of the present invention is to provide such a desoldering system including a desoldering tip having a plurality of apertures through which the liquefied solder may be sucked up without any possibility of the solder flowing out again accidentally through the openings in the tip.

Another object of the present invention is to provide the desoldering attachment of the system with a three-way triggerable valve whereby the desoldering tip may be connected at will to a vacuum line which may be automatically closed by spring pressure while simultaneously permitting at will the access of air to the desoldering attachment whereby the solder may be removed and the attachment cleaned.

Still a further object of the present invention is to provide a soldering extractor connectable to a vacuum line and maintained in a tilted position to facilitate the removal of the solder through the suction openings of the desoldering tip.

SUMMARY OF THE INVENTION

Briefly these and other objects of the invention are achieved in accordance with the structural features of an example of the present invention by providing a desoldering attachment, including a sleeve surrounding the heater element of the soldering instrument onto which the desoldering tip may be attached, for example, by screw threads. The sleeve is provided with at least one filter for screening out the solder particles drawn in by the action of the vacuum. A barrel is connected to the sleeve which terminates in a three-way trigger valve assembly. A spring biased element normally closes a vacuum line connected to the barrel. By depressing the trigger, the vacuum line is connected to the desoldering attachment whereby the liquefied solder may be sucked in.

The desoldering attachment including the desoldering tip may be pressed into a solder extractor also connectable to a vacuum line. The extractor is spring biased to close the vacuum line. Upon depressing, the upper portion of the solder extractor, a snap action takes place. The vacuum connection is uncovered and the solder in the desoldering tip may be sucked out through the openings or apertures in the tip. The desoldering tip is so designed that it has a recess or reservoir in its inner surface below the surface where the suction apertures end so that the sucked in solder will be unable to flow out again through the apertures of the desoldering tip.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

BRIEF DESCRIPTION OF THE DRAWINGS

FIG. 14 is a sectional view of a solder extractor instrument suitable for use with a desoldering attachment as illustrated in FIGS. 1 through 13, the extractor being shown in its normal position with the vacuum line blocked;

FIG. 15 is a sectional view similar to FIG. 14 and showing the extractor instrument in a preferred position at an angle of approximately 45° for collecting most of the solder in a desoldering tip, the extractor being shown in its operating position with the vacuum line unblocked; and FIGS. 16, 17 and 18 are top elevational views of different inserts which may be used with the solder extractor instrument of FIGS. 14 and 15 to fit different types of desoldering tips.

DESCRIPTION OF THE PREFERRED EMBODIMENT

Figure 1:
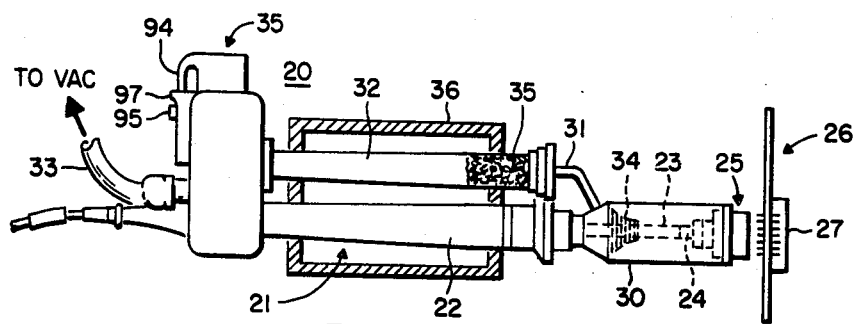
FIG. 1 is a side elevational view of a soldering tool provided with the desoldering attachment of the present invention and including a three-way trigger assembly and valve.

Referring now to the drawings and particularly to FIG. 1, there is illustrated the desoldering attachment of the present invention. The desoldering attachment generally shown at 20 is used in connection with a soldering instrument generally shown at 21. The soldering instrument may be of the temperature controlled type such as disclosed in the applicant's prior U.S. Pat. No. 3,883,716 previously referred to. The soldering instrument 21 is provided with a handle 22 and a heater element sleeve or sheath 23 within which is disposed a heater element 24.

Attached to the heater element sleeve 23 is a soldering tip generally designated 25 which will presently be described in detail hereinafter. The soldering instrument and desoldering attachment are shown in connection with a printed circuit board 26 having a dual-in-line integrated circuit package 27 which is to be removed by desoldering. A desoldering sleeve 30 surrounds the heater sleeve 23 and forms an air tight connection between the desoldering tip 25 and the handle 22 of the soldering instrument. A vacuum inlet pipe 31 interconnects the desoldering sleeve 30 with a vacuum barrel 32 which in turn is connected to a vacuum line 33 by a trigger assembly 35 providing a three-way valve.

A solder trap and filter are generally shown at 34 within the desoldering sleeve 30. An additional filter 35' may be provided in the desoldering barrel 32 for preventing any solder from flowing into the trigger assembly 35 or the vacuum line 33. A desoldering tool handle 36 may also be provided to hold together the vacuum barrel 32, trigger assembly 35 and soldering tool handle 22.

Figure 2:
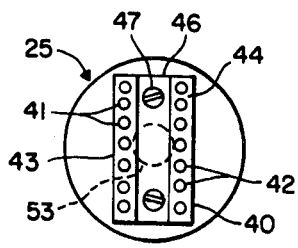
FIGS. 2, 3 and 4 are respectively a front elevational view, a side elevational view and a rear elevational view of a desoldering tip suitable for removing and desoldering the pins of a dual-in-line integrated circuit package.
Figure 3:
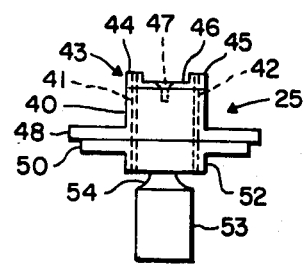
Figure 4:
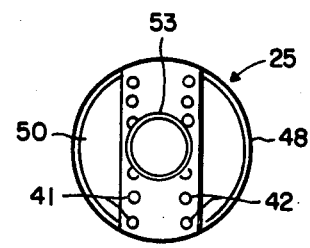

The detailed construction of the desoldering tip 25 is illustrated by way of example in FIGS. 2 through 4. Other examples of desoldering tips will be described hereinafter. The desoldering tip 25 illustrated in FIGS. 2 through 4 includes an outer, body portion 40 of substantially rectangular outline shown in FIG. 2 provided with a plurality of suction holes or apertures 41 and 42 extending entirely through the desoldering tip. In the example of FIGS. 2 through 4 there are shown two rows of apertures 41 and 42, each having seven holes with a total of 14 holes. Such a desoldering tip makes it possible to remove the solder on a 14 pin dual-in-line integrated circuit package all at once. The outer end of the solder tip as clearly shown in FIG. 3 consists of a tip portion 43 having two rectangular extensions 44 and 45 forming a depressed portion 46 therebetween. This outermost tip portion 43 may be secured by screws 47 to the tip body portion 40. The outermost tip portion 43 preferably consists of steel or iron such, for example, as so-called Armco iron. This material is conventionally used for transformer cores. It is characterized by its resistance to corrosion, for example to solder flux at elevated temperatures. It is also readily wetted by solder and is easy to clean. The remainder of the solder tip preferably consists of copper to maximize its heat conduction capability; and it may, for example, be nickel plated to provide corrosion protection and good appearance.

The outer portion 40 of the solder tip 25 is integral with a circular disk 48 having a lower portion 50 with a reduced diameter for a purpose to be explained hereinafter. The apertures 41 and 42 extend through another portion 52, joined to the circular portion 48, 50 and which also has a rectangular outline similar to that of the tip portions 40 and 43. Finally the desoldering tip is terminated by a cylindrical portion or sleeve 53 having internal threads mating with the external threads of the heater sleeve 23. The portion of the sleeve 53 joining the rectangular portion 52 may be recessed or tapered as shown at 54 to provide space for holes 41 or 42 terminating in the neighborhood of the sleeve 53.

Figure 5:
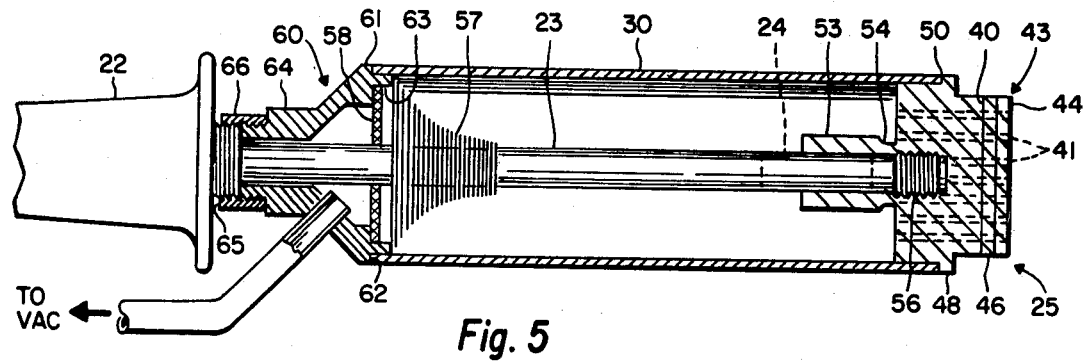
FIG. 5 is a cross-sectional view on enlarged scale illustrating the sleeve surrounding the heater element and upon which a desoldering tip has been screwed and provided with a solder trap and an outlet toward the vacuum line.

A somewhat enlarged view of the desoldering tip 25 inserted into the desoldering sleeve 30 and secured to the heating element sleeve 23 is shown in FIG. 5 to which reference is now made. As shown here, the desoldering tip 25 is provided with internal screw threads meshing with the external screw threads 56 of the heater sleeve 23. It will also be noted that the sleeve 53 of the desoldering tool surrounds the heater sleeve 23 and has a tight fit therewith to provide a firm connection.

The upper or rear portion of the desoldering sleeve 30 is provided with a solder trap 57 which consists of a relatively tightly wound spring. The spring may either be of frustoconical shape or may be somewhat tapered or curved as shown in FIG. 5 to provide a generally bell-shaped outline. The spring will normally operate as a trap for the solder and may readily be cleaned by extending or pulling it when the solder falls off between the individual spring windings. There is also provided a filter screen 58 which may simply consist of a metal disk, for example, of stainless steel, provided with etched apertures.

The desoldering sleeve 30 is connected to the handle 22 of the desoldering instrument by a cap member 60. The cap member 60 has a conical portion 61 provided with a cylindrical shoulder recess 62 in which the desoldering sleeve 30 is retained. The member 60 is also provided with a plurality of legs or extensions 63 upon which the solder trap 57 may rest. Instead of individual legs 63 there may alternatively be provided an outwardly extending cylinder. In any case the connection between the sleeve 30 and the cap 60 should be reasonably air tight.

The cap 60 has a cylindrical portion 64 of reduced diameter which surrounds the heater sleeve 23 and is provided with external threads 65. The threads 65 mesh with the internal threads of a connecting sleeve 66 which firmly connects the desoldering sleeve 30 and cap 60 to the handle 22 of the soldering instrument.

An inlet pipe 33 extends into the rear portion of the sleeve 30 behind the solder trap and is connected in turn to a vacuum source. This may, for example, consist of the vacuum pump disclosed and claimed in applicant's U.S. Pat. No. 4,056,334 previously referred to. Preferably the inner diameter of the inlet pipe 33 is on the order of ¼ inch to provide a sufficient flow of air through the 14 solder suction apertures 41, 42 of the solder tip of FIGS. 2 to 4.

Figure 6:
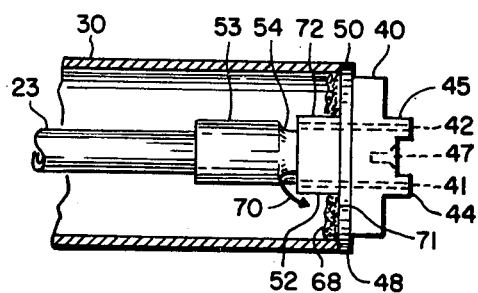
FIG. 6 is an elevational view partly in section of the sleeve of FIG. 5, taken at right angles to the view of FIG. 5 and with the desoldering tip of FIGS. 2 through 4 illustrating the recess of the desoldering tip for collecting the solder.

The operation of the desoldering attachment of the invention may be explained in connection with FIG. 6 to which reference is now made. When the heater element 24 is energized, the desoldering tip 25 becomes sufficiently hot to melt the solder of whatever component or integrated circuit package is to be removed. Thereafter the trigger assembly 35 is actuated in a manner to be explained hereinafter to connect the inlet pipe 33 to the vacuum source. Subsequently the hot solder is sucked in through the apertures 41 and 42 of the desoldering tip. The solder now moves in the direction generally illustrated by arrow 70, falls downwardly due to gravity, and comes to rest on a ledge or surface 71 which is formed on the disk 50 below the level of the rectangular element 52 of the desoldering tip. Hence an annular reservoir is formed between the walls of the desoldering sleeve 30, the ledge 71 and the straight, vertical wall 72 formed by the rectangular portion 52 of the desoldering tool. This in turn prevents the solder from dropping out again through the apertures 41 and 42 and back onto the component being desoldered. The collected solder is shown at 68.

Figure 7:
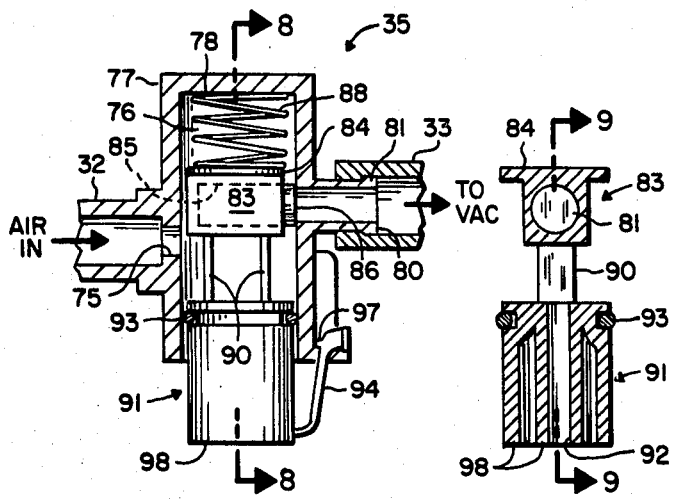
FIG. 7 is an elevational view partly in section of the trigger three-way valve utilized with the desoldering attachment of the invention.
Figure 8:
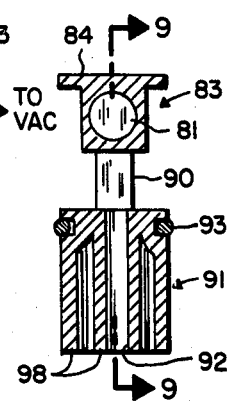
FIG. 8 is a sectional view of the valve mechanism taken on line 8—8 of FIG. 7 but illustrating only the valve element.
Figure 9:
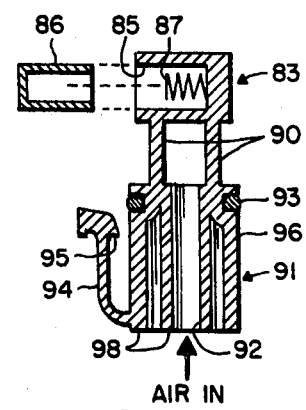
FIG. 9 is a cross-sectional view of the structure of FIG. 8 taken on line 9—9 thereof.
Figure 10:
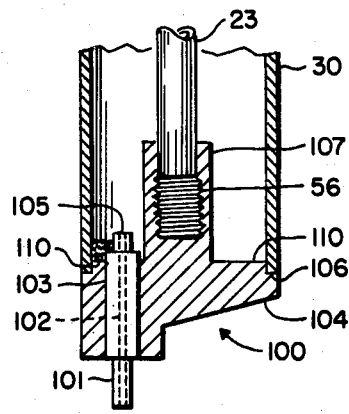
FIGS. 10 and 11 are respectively a sectional view and an end elevational view of a single point desoldering tip which may be used with the desoldering attachment of the present invention.
Figure 12:
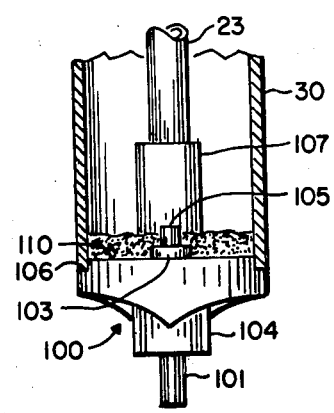
FIGS. 12 and 13 are a side elevational view, partly in section, and a rear end view of the single point desoldering tip of FIGS. 10 and 11 and again showing the recessed portion of the solder tip for the solder sucked in by the instrument.

The detailed construction and operation of the trigger assembly 35 is illustrated by way of example in FIGS. 7 through 9 to which reference is now made. As shown particularly in FIG. 7, the desoldering barrel 32 is connected to the trigger assembly 35 and in turn to the inlet pipe 33 connected to the vacuum source. The barrel 32 has an air inlet opening 75 of reduced diameter connected to an open cylinder 76 formed by a cylindrical housing 77 closed at one end as shown at 78. An air outlet 80 may have an enlarged ridged end portion 81 for connecting it to the vacuum line 33. It should be noted that the cylindrical housing 77 is open to provide an outlet to the ambient air as will now be explained.

The three-way valve is formed by a box-like hollow structure 83 having a disk-shaped end 84. The hollow box 83 is provided with a cylindrical opening 85 into which fits a piston 86 slidably arranged in the cylindrical opening 85 and urged outwardly by a spring 87. The piston 86 normally blocks the air outlet 80 of the trigger assembly. Similarly the box 83 unblocks the air inlet 75 of the desoldering barrel 32. Hence, as clearly shown in FIG. 8, the air inlet 75 is disposed below the air outlet 80. The box 83 in turn is spring biased by a spring 88 having one end bearing against the wall 78 while its other end bears against the disk 84.

The spring 88 is a compression spring adapted to urge the box 83 to block the vacuum line 33. The box 83 is connected, for example, by two legs 90 to a hollow piston 91 having a central opening 92 connectable to the desoldering barrel 32 and the vacuum pipe 33. An O-ring 93 seals the piston 91 slidably into the cylindrical housing 77 of the trigger assembly.

The piston 91 is provided with an extension or arm 94 which is somewhat flexible. It is provided with a detent 95 at its free end facing the wall 96 of the piston 91. The detent 95 is arranged to cooperate with a similar recess 97 on the wall of the housing 77. The detent 95 and recess 97 limit the travel of the valve structure 83, 91 which is otherwise urged by the springs 88 out of the trigger assembly and its housing 77.

When it is desired to suck in the liquefied solder, the operator presses his thumb against the outer surface 98 of the piston 91 thereby closing the central opening 92 and depressing the entire valve structure against the spring 88 until the piston 86 uncovers the opening provided by the air outlet 80 thereby to permit the air to flow from the barrel 32 through the opening 75 toward the vacuum pump.

When the solder has been sucked in in the manner described, the operator will simply release his thumb from the surface 98 whereby the piston 86 again, due to the action of spring 88, covers the opening formed by the outlet 80.

It will be understood that different types of desoldering tips may be provided with the desoldering system of the invention. Instead of having dual-in-line openings, a single row of openings may be provided. Similarly the number of openings may be different, depending on the component to be desoldered. The desoldering tips are easily exchangeable by simply unscrewing one and connecting another to the heating sleeve 23. Hence, further by way of example, reference is now made to FIGS. 10 through 13 which illustrate a single point desoldering tip. Thus the desoldering tip 100 has a single tip 101 through which extends a single solder extracting aperture or suction hole 102. The extension 101 of the solder tip 100 terminates in an enlarged cylindrical portion 103 which in turn is mounted in a heat conducting element 104. The cylinder 103 has a rearwardly extending cylindrical portion 105 of reduced diameter forming the interior tip orifice through which the solder flows into the desoldering sleeve 30.

Figure 11:
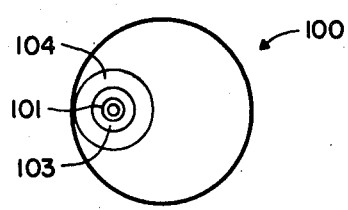
Figure 13:
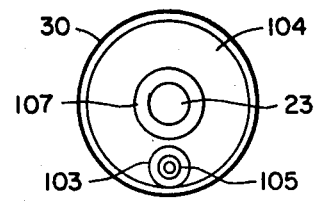

The heat conducting element 104 is of generally cylindrical shape as clearly shown in FIGS. 11 and 13. It is provided with an internal cylindrical recess 106 into which fits the desoldering sleeve 30. The element 104 again is provided with a rearward cylindrical portion or sleeve 107 which is internally threaded to receive the external threads 56 of the heater sleeve 23.

A lower ledge 110 is provided in the element 104 which is below the level of the interior tip orifice 105. Hence any solder sucked in through the aperture 102 will rest in the reservoir formed by the ledge 110, the internal wall of the sleeve 30, and the cylindrical wall formed by the orifice portion 103 and its interior tip orifice 105 or the wall of the sleeve 107.

Hence it will be evident that the single point desoldering tip of FIGS. 10 through 13 again operates to prevent the overflow of any sucked in solder back into the desoldering orifice 102. From time to time the solder sucked in by the solder tip such as tip 25 or the tip 100 has to be removed to clean the desoldering attachment. This may be effected with a solder extractor or cleaning device of the type illustrated in FIGS. 14 and 15 to which reference is now made.

FIG. 14 illustrates the solder extractor in its inoperative or normal position, that is when it is not ready to extract solder. The instrument may consist, for example, of a vacuum chamber cylinder 115, a cap 116 which fits over the cylinder 115, an insert 117 which will accommodate a particular desoldering tip, and a base 118. The vacuum chamber cylinder 115 may, for example, be made of polytetrafluoroethylene resin sold uner the trademark Teflon of DuPont. However, other resins or plastic materials may be used instead which are not attacked by solder.

The chamber cylinder 115 has an internal shoulder recess 120 about mid-way in the cylinder, upon which rests a filter screen 121 which may be similar to the filter screen 58 shown, for example, in FIG. 5. Hence it may consist of stainless steel having a plurality of etched openings to permit air to flow through while retaining solder.

The cap 116 is also of cylindrical shape and fits over the cylinder 115. It has an inwardly projecting annular flange 122 upon which rests the insert 117. The insert 117 is of cylindrical shape and has a relatively small central inner opening 123 and a somewhat larger, concentric, communicating outer cylindrical opening 124. The opening 123 may be of rectangular outline as shown in FIG. 16 and is of a size to accommodate the outwardly projecting portion 40 of the desoldering tip of FIGS. 2 through 4. The circular opening 124 is of a size to accommodate the cylinder 48 of the desoldering tip.

The chamber cylinder 115 is provided with an outer annular detent 125 which fits into a corresponding annular recess 126 in the cylindrical base 118. The cylinder 115 has a lower, annular disk-like cover 127 and an upstanding central cylindrical portion or boss 128 surrounding a corresponding, closed, except as noted below, cylindrical extension 130 of the base 118. Two O-rings 131 are provided to seal off the cylindrical boss 128 from the cylinder 130. The O-rings are held axially stationary with respect to the boss 128 by conventional detent means, not shown. The vacuum chamber cylinder 115 is upwardly biased by a spring 132 and is held normally in the position of FIG. 14 by the detent 125 and annular recess 126. As described below, axial mechanical force applied by the operator overcomes, when desired, the holding function of detent-recess 125, 126. The cylinder 130 in turn is connected to a vacuum pipe 133 which in turn is connected to a vacuum source. The cylinder 130 is closed at the top but has an opening 135 disposed between the two O-rings 131. Hence in the normal position of FIG. 14 the vacuum connection is sealed off by the two O-rings 131.

As illustrated in FIG. 15 the solder extractor is preferably mounted on a pedestal 136 in such a manner that the solder extractor is tilted at an angle of approximately 45°. This will facilitate removal of the solder in the reservoir formed by the ledge 52 as previously explained.

In order to remove the solder the desoldering tip 25 is pushed into the solder extractor in such a manner that its tip portion 40 extends through the rectangular opening 123 while its disk 48 fills the opening 124. Mechanical force by the operator is now exerted on the desoldering sleeve 30 in a generally downward direction. This will force the cap 116 and the vacuum chamber cylinder 115 downwardly against the action of spring 132. As a result, the vacuum outlet 135 is now uncovered and the action of the vacuum tends to pull abruptly downwardly the entire movable portion of the extractor, that is cylinder 115, cap 116 and insert 117. The whole action is like that of a vacuum boosted snap action spring, that is, as soon as the opening 135 is uncovered, the vacuum will strongly pull the entire structure downwardly into the position shown in FIG. 15.

Due to the angle in which the solder extractor is held by the pedestal 136, the solder will collect as shown at 140 in FIG. 15 in a corner of the desoldering tip 25. This now allows the solder to flow back through the apertures 41 or 42 into the vacuum chamber formed by the cylinder 115. The filter screen 121 will retain the solder but permit the air to flow through.

This action in turn is facilitated by the provision of the trigger assembly 35. In the normal position of the trigger assembly shown in FIG. 7, the opening 92, being not covered by the thumb of the operator, permits air to flow into the opening 92, through the opening 75 and to desoldering barrel 32 and hence through the sleeve 30 and the apertures 41 or 42. Hence an important function of the trigger assembly as shown particularly in FIGS. 7 through 9 is that unless the opening 92 is covered up, air can pass through the air inlet 92, through the opening 75 into the desoldering barrel 32 and hence through the desoldering sleve 30 to force the solder out of the apertures 41.

When the solder, or most of the solder, has been removed by the solder extractor shown in FIG. 15, the desoldering tip 25 is removed from the insert 117. This will permit the air pressure in the cylinder 115 to increase hence permitting the spring 132 to return the cylinder 115 and associated elements back onto the position illustrated in FIG. 14. The vacuum connection 135 is now blocked again.

It will be realized that the insert 117 may readily be exchanged and may assume different shapes to accommodate different types of desoldering tips. Thus FIG. 17 is a top plan view of such an insert 140 having a central circular aperture 141 for a single point desoldering tool and having a larger opening 142 to accommodate the barrel of the desoldering tip. Similarly FIG. 18 illustrates another insert 145 having a larger central aperture 146 to accommodate the desoldering tip for a round integrated circuit component. The larger circular opening 147 will again accommodate the outer barrel of the desoldering tip.

There has thus been disclosed a desoldering system which permits one to desolder in a single operation, for example, the solder from a dual-in-line integrated circuit component and the like. Accordingly, the desoldering attachment for a soldering instrument features a large vacuum inlet connection to provide enough suction to a plurality of solder extracting apertures which may be as many as 14 or 16. The desoldering tip is arranged in such a manner that the extracted solder rests in a reservoir below the level of the exit of the desoldering apertures. The attachment is provided with a three-way valve which can easily be operated by one hand of the operator holding the soldering instrument and the attachment. The valve normally blocks off the vacuum inlet but can be opened by the thumb of the operator. Alternatively an air outlet which is normally closed by the thumb of the operator may be uncovered to provide a path for the air when the attachment is being cleaned. To this end there is provided a special solder extractor which features a vacuum boosted snap action to open the vacuum chamber cylinder to the vacuum line. Preferably the extractor is maintained at an angle of approximately 45° so that at least the major part of the solder previously deposited in the inner reservoir of the desoldering tip can be efficiently removed.

What is claimed is:

1. A solder extractor for a desoldering attachment of the type having at least one solder removing aperture in a desoldering tip, said extractor comprising:
   (a) a base;
   (b) a cylinder slidable in said base;
   (c) a filter screen disposed in the interior of said cylinder;
   (d) said base having a vacuum line extending therethrough having an opening;
   (e) said cylinder having a centrally extending boss surrounding said opening of said vacuum line;
   (f) means normally sealing said vacuum line against said boss of said cylinder;
   (g) detent means between said base and said cylinder for maintaining said cylinder in a position sealing off the opening in said vacuum line;
   (h) spring means biasing said cylinder against said base towards said detent means; and
   (i) an insert for said cylinder for receiving a particular type of desoldering tip, whereby when said insert is closed by said tip and when said tip is pushed against the spring means, said vacuum line is uncovered, thereby to pull said cylinder inwardly against the action of said spring means.

2. A solder extractor as defined in claim 1 wherein said insert has a first opening therethrough for receiving the body of a desoldering tip and has a second outer opening therein for receiving a disk-like extension of said desoldering tip.

3. A solder extractor as defined in claim 1 wherein means is provided for maintaining said extractor at an angle of approximately 45° with respect to a vertical thereby to facilitate the extraction of the solder from a desoldering tip.

* * * * *